Jan. 27, 1970   P. J. ENGELDRUM   3,491,671
CAMERA BACK ADAPTER PLATE
Filed Jan. 26, 1967   3 Sheets-Sheet 1
Fig. 1
Fig. 3
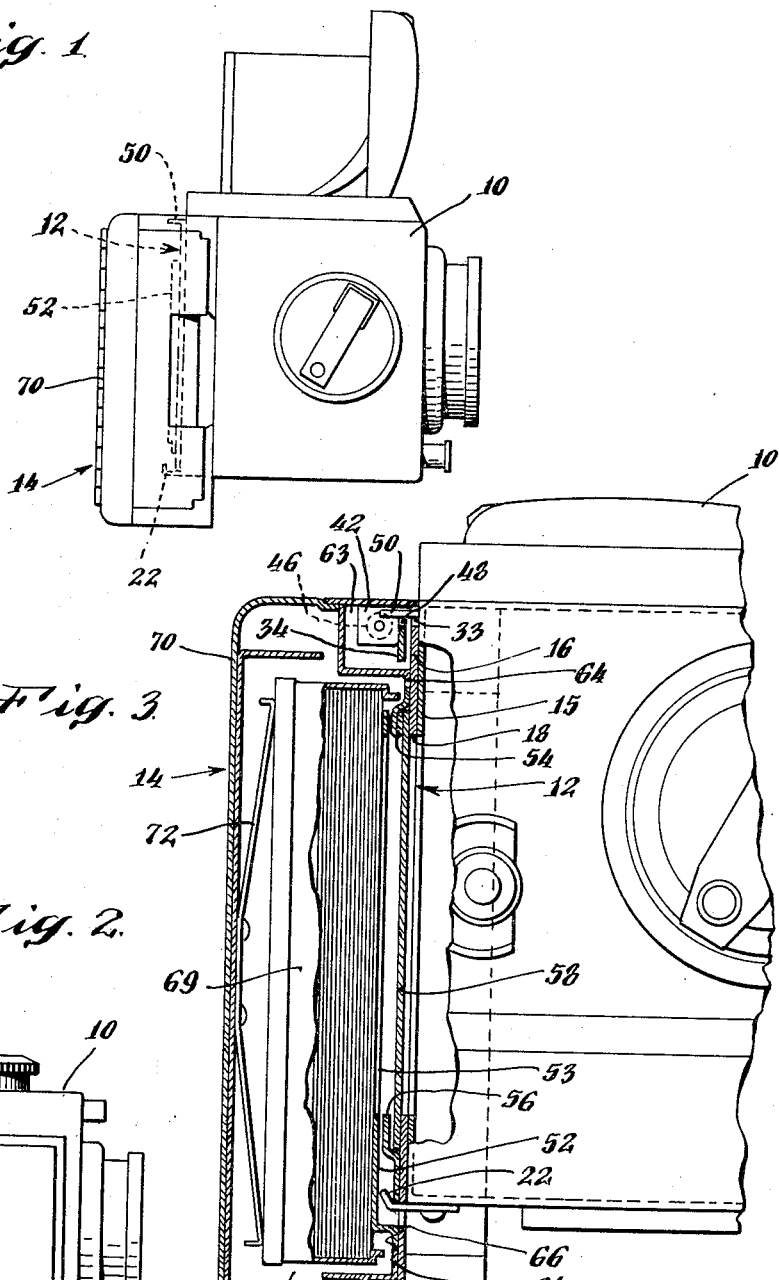
Fig. 2
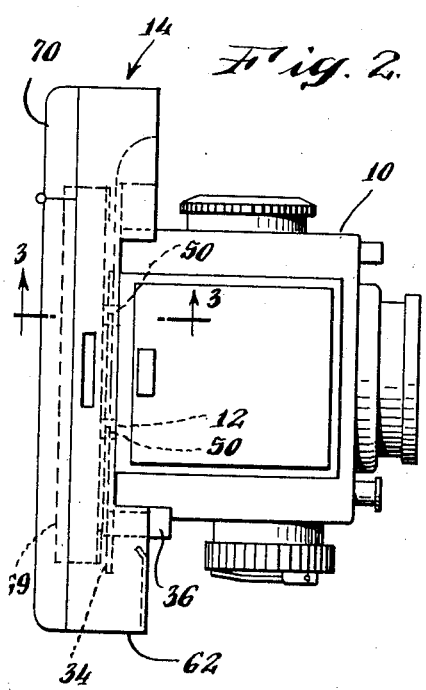
INVENTOR.
Philip J. Engeldrum

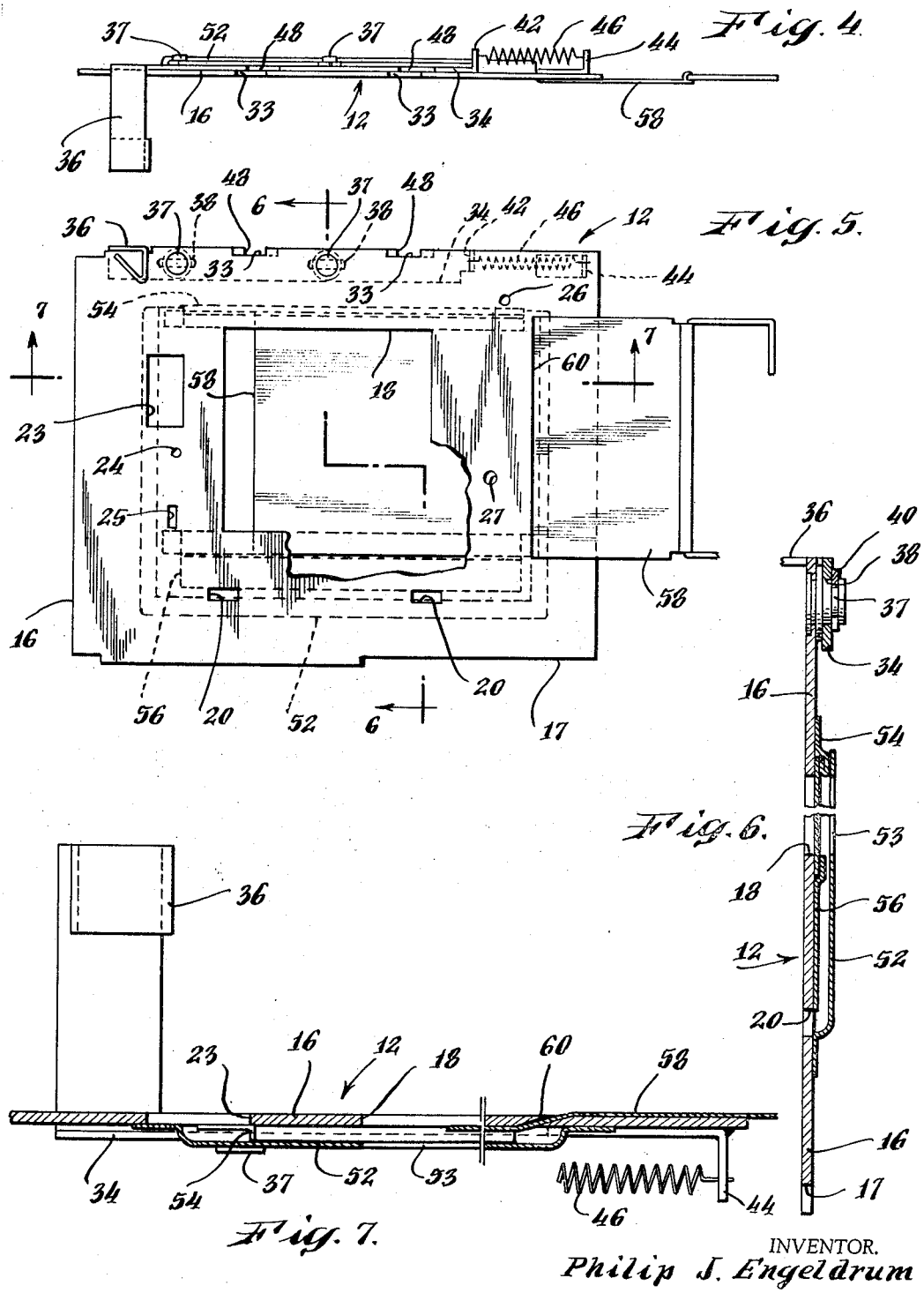

Jan. 27, 1970  P. J. ENGELDRUM  3,491,671
CAMERA BACK ADAPTER PLATE
Filed Jan. 26, 1967  3 Sheets-Sheet 3
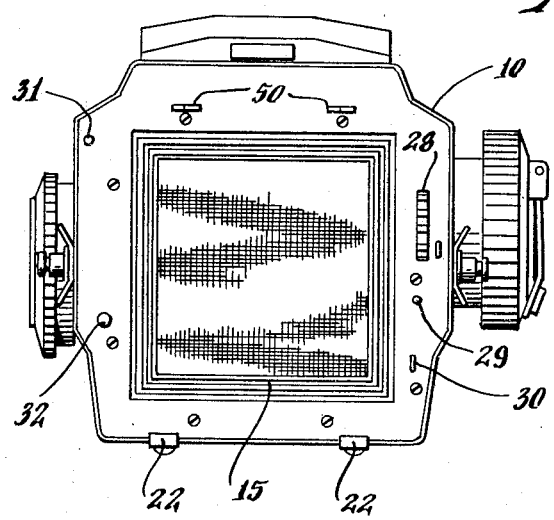
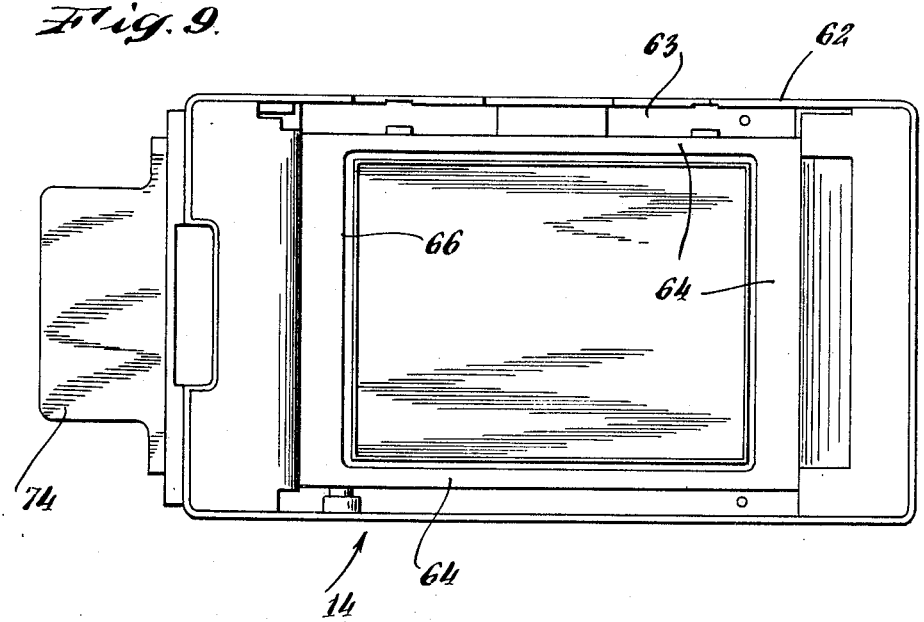
INVENTOR.
Philip J. Engeldrum United States Patent Office 3,491,671
Patented Jan. 27, 1970

3,491,671
CAMERA BACK ADAPTER PLATE
Philip J. Engeldrum, Bronx, N.Y., assignor to Photo Mechanics Corp., Norwalk, Conn., a corporation of Connecticut
Filed Jan. 26, 1967, Ser. No. 611,899
Int. Cl. G03b 19/04
U.S. Cl. 95—31                    3 Claims

ABSTRACT OF THE DISCLOSURE

An adapter plate to connect the lens portions of a camera and a film pack holder together. The plate and the film holder are bonded together with an adhesive. Lugs are provided in the rear face of the lens portion of the camera to engage slots on the face of the adapter plate. A spring biased latch secures the lugs in the slots to form a camera. A slot is provided in the plate for the insertion of a screen member if desired.

---

This invention relates to an interconnecting plate assembly for making possible the use of photographic film packs sometimes referred to herein as Polaroid type pack film with the lens carrying body portion of a camera of the kind normally used with an interchangeable roll film back, and to a combination of said plate assembly with a Polaroid type film pack holder or back and such a roll film camera body.

There are at present available commercially high resolution type cameras, such as the Bronica and the Hasselblad, using roll film, which comprises a lens carrying portion and the roll film carrying portion or back. The roll film carrying portion is a separate unit comprising a housing with a roll film in it. The body portion has projecting from its rear surface hook-like members and brackets by means of which the roll film carrying portion can be detachably secured to the body portion. When the roll film of one unit has been completely exposed the unit may be detached from the camera body portion and replaced by another unit with an unused roll of film. Such units may be obtained comprising either color, or black and white type film. If while using a roll which gives black and white photographs it is desired to shift to a roll of color film, or vice versa, this can be done by substituting one roll film unit for another.

No provision has previously been made for using Polaroid type pack films with cameras of the Bronica and Hasselblad type, and holders of Polaroid type pack film are not commercially available for such camera bodies. The frame or back of a Polaroid Land Camera Series One Hundred, without the accordion pleated mounting for the lens, shutter and other control means, has been supplied without change to some industrial concerns which have used it in connection with instruments such as oscilloscopes. Such a "back" when sold alone has been denominated by the Polaroid Corporation as a Polaroid Land Camera Back Series One Hundred Film Pack Adapter.

It is often desirable for users of high resolution cameras, such as the Bronica and the Hasselblad, to be able to obtain an instant photographic record, both in the studio and in the field. For example, such cameras with 2¼ x 2¼ format are widely used by professional photographers for advertisement purposes and magazine illustrations. To be able to use Polaroid type pack film with such cameras would fill a need for speed, portability and resolution that cannot be matched by the larger 4" x 5" format cameras. The resulting quickly obtained prints could be displayed to clients for rough layouts and to document an advertising campaign, for example.

It is an object of the invention to provide means making possible the use of Polaroid type pack film with cameras of the kind mentioned above.

Another object of the invention is to provide means for interconnecting a high resolution camera body of the kind mentioned above and a Polaroid type pack film holder or back.

Another object of the invention is to provide a connector plate assembly for interconnecting such a camera body and such a type pack film holder.

Another object of the invention is to provide means for interconnecting the lens carrying portion of a high resolution type camera body, such as the Bronica body portion, and a Polaroid Land Camera Back Series One Hundred Film Pack Adapter.

This invention will be best understood by reading the following description in connection with the drawings, in which:

FIGURE 1 is a side elevation of an assembly of a Bronica camera body and a Polaroid Land Camera back interconnected by a connector plate assembly comprising my invention, FIGURE 2 is a top plan view of the assembly shown in FIGURE 1 with the viewer cover down, FIGURE 3 is an edge view of my connector plate assembly, including a removable light screen, FIGURE 4 is a top plan view of the assembly shown in FIGURE 5, FIGURE 5 is a front elevation of the interconnecting plate assembly, FIGURE 6 is a cross section taken on the lines 6—6 of FIGURE 5, FIGURE 7 is a cross section taken on the lines 7—7 of FIGURE 5, FIGURE 8 is a plan view of the rear or open face of the body or lens carrying portion of a Bronica camera, and FIGURE 9 is a plan view of a front or open face of the frame or "back" of a Polaroid type camera adapted to carry a pack of Polaroid type film sheets, and shows specifically a Series One Hundred Land Camera back.

As seen in FIGURES 1, 2 and 3, the numerals 10, 14 and 12 respectively, identify generally; the lens carrying body portion of a Bronica camera; a modified Polaroid Land Camera Series One Hundred film pack adapter or "back" which comprises a holder for self processing photographic pack film; and a connector plate assembly for interconnecting the Bronica camera body portion and the Polaroid Land Camera film pack adapter or "back."

In employing my connector plate assembly it is first secured, as by epoxy resin, to the front face of a film pack holder or "back," which is shown in FIGURE 9 and is described herein, and the assembly thus provided is attached to the rear face of a Bronica type camera body.

As best seen in FIGURES 3–7 the connector plate assembly comprises, a plate 16 in which the window 18 is provided, a sliding latch bar 34, and light shield means 52 to cover one or more apertures provided in the margin of the plate to enable it to bridge over projections from the rear surface of the camera body, such as projections 28–32 referred to herein, to conform to, and lie flat against, the rear face of a camera body to which it is applied.

Adjacent its lower edge the plate is provided with the slots 20 which receive the upwardly curved ends of bracket arms 22 respectively which protrude rearwardly from the bottom of the camera body. Along its lateral margins the plate is apertured with the apertures 23, 24, 25, 26 and 27 to receive protuberances projecting from the lateral margins of the rear face of the camera body. What these protuberances are is not important relative to this invention except that by providing apertuers for them they do not prevent the plate from making a close fit with, and lying flat against, and in engagement with, the back of the camera body. In the case of the Bronica camera body used herein to illustrate an embodiment of the invention, the protuberances for which the apertures 23–27 provide clearance are respectively, a sprocket drive 28, which, when the camera body is assembled with a roll film carrying "back," engages means for cranking a roll film mounted in the "back"; pins 29 and 31 which normally serve as positioning pins, being received in concavities provided in the front face of the roll film "back"; an interlock button 32 which normally controls the shutter crank of the Bronica, and the frame counter 30.

Along its upper edge the plate 16 is notched with two notches 33, spaced apart to register with cooperating means carried by the camera body, the means shown being the slotted lugs or hooks 50, and mounted for sliding movement on the rear surface of the plate along its upper edge is a latch bar 34 which is an elongated flat member from one end of which the finger piece 36 extends outwardly at a right angle. The latch bar is mounted on the rear surface of the plate by pin and slot means which allows the desired amount of movement of the latch bar relative to the plate. As shown in FIGURE 5 two pins 37 are provided projecting from the plate 16 along the upper margin and in latch bar 34 the slots 38 are provided to receive pins 37 respectively. The pins may be rivets, the inner ends of which are peened over to provide heads wider than the slots to keep the pins attached to the plate. Adjacent the outer ends the shanks may be reduced in diameter to receive spring clips 40 for holding the latch bar in operative position close to the rear surface of the plate.

On the latch bar, adjacent its end which is remote from the finger piece 36, is a bracket 42 extending toward a bracket 44 provided on the rear surface of the plate, and a coil spring 46 is mounted by and between the two brackets. Along its upper margin the latch bar is notched with noches 48 similar to the plate notches 33 and spaced apart the same distance as the notches 33. In use the latch is pushed laterally by finger piece 36 against the force of spring 46 to bring the notches 48 of the latch bar into alignment with the notches 33 of the plate, and the plate is positioned against the back of the camera body so that the slotted lugs or hooks 50, which protrude from the back of the camera body, are positioned within the aligned notches of the plate and latch bar. The latch bar is then released and the action of spring 46 moves the latch bar so that the edges of the latch bar defining notches 48 enter the horizontally directed mouths or slots of the lugs or hooks 50. The interengagement provided by the coaction of the latch bar and the slotted lugs or hooks 50, together with the interengagement of the plate slots 20 with the camera body bracket arms 22, holds the camera body attached to the connector plate assembly.

Secured to, but spaced from, the rear of the plate is a light shield 52 which extends over the apertures 23, 24, 25, 26 and 27, but is cut away centrally providing a window 53 aligned with the plate window 18. The edges of the light shield do not extend to the edges of the plate, which is important in assembling the plate over the window 66 in the open, front face of the pack film holder.

On the plate 16, above and below the window 18, the guides 54 and 56 are provided to receive and guide a flexible light screen 58, which may be inserted through the slot 60 provided in the plate along one margin of the window. As indicated in FIGURE 7 the slot 60 is inclined toward the rear face of the plate to facilitate inserting a flexible light screen through the slot into the guideway provided between the guide members 54 and 56. These members each comprise a portion fixed to the plate and an inwardly extending portion spaced from the plate by an intermediate portion which is angularly related both to the fixed portion and to the guide forming portion. The guide members are not necessarily the same. As shown in FIGURE 6 the portion of the lower guide member 56 which is attached to the rear face of the plate is extended downwardly onto the top of the bracket arms 22 which project outwardly from the camera body.

A light screen 58 may be inserted through plate slot 60 into the guideway provided by members 54 and 56 on the back of the plate, to cover the window 54, at any time, before or after the plate assembly has been fixed to the face of the Polaroid film pack holder and after the combined Polaroid film pack holder has been attached to the roll film camera body. While using an assembly of a roll film camera body and a Polaroid back, interconnected by my plate assembly, it may be desired to shift from black and white film to color film or vice versa, before all the film sheets in the back have been exposed, and this may be accomplished without exposing and thus destroying any of the unused film sheets by inserting a light screen 58 through the slot 60 in the plate 16 attached to the Polaroid back before detaching the back from the camera body and then substituting another back equipped with my connector plate assembly and loaded with the desired film. If later on it is desired to use the films in the detached back it is only necessary to reassemble it with the camera body and withdraw the screen in order to put the assembly into operative condition.

The pack film holder as shown in FIGURE 9 comprises a frame rim 62 spaced by a downwardly offset portion 63 from a rectangular flat surface 64 which defines a window 66. Behind the surface 64 and aligned with window 66 there is a recess 68 to receive a film pack 69 with the film sheets facing the window. A rear cover 70 is hinged to the frame, adjacent its lower end, and cooperates with the recess defining portion of the frame to provide a housing for a film pack behind said window. On the inside of the cover 70 a spring 72 is provided which presses against the rear of a film pack disposed in recess 68. No film pack in detail is shown since it comprises no part of this invention, but the pack for the Land Camera back Series One Hundred is a box-like member with initially eight film sheets in front of the somewhat resilient front wall, each film sheet being attached to a sheet within the "box" and behind the front wall which carries small capsules of developer solution. When a film sheet has been exposed a tab 74 attached to it is pulled and this action draws the attached developer sheet over the film sheet exposing a tab carried by the developer sheet. By now pulling on the tab attached to the developer sheet the superimposed film sheet and developer sheet together are drawn between rollers which break the capsules and spread the developer solution over the film sheet, which, after a moment, may be drawn out of the back as a printed positive.

The surface 64 of the front face of the frame surrounding the window 66 is flat and the peripheral margin 17 of the connector plate is placed against this surface, with the latch bar 34 disposed in the space 63 on one side of the window frame 64, with the rearwardly projecting guides 54 and 56 and light shield 52 extending into the space defined by the frame window 66, into close proximity to the foremost of a pack of film sheets disposed in the recess 68 behind the window. In this position the plate window 18, the light shield window 53, and the frame window 66 are all aligned.

The plate assembly is attached to the surface 64 of the Polaroid Land camera back in any suitable way, preferably by the use of adhesive such as epoxy resin. The combined back and plate assembly is then attached to the rear surface of a camera of the Bronica type as has been described.

In order to bring the rear face of the Bronica camera body, which is square, close enough to be connected to a plate assembly already attached to the face of a Land camera back, which is rectangular, a portion of the top wall or rim of the back may be cut away as shown in FIGURE 2.

There are has thus been provided means by which the above stated objects are accomplished in a thoroughly practical way.

What I claim is:

1. In combination, a film pack holder defining a chamber to receive a plurality of superimposed film sheets, the front of the chamber having a flat surface defining a window through which light may be admitted into said chamber to expose a film sheet disposed therein behind said window, the holder having a peripheral rim projecting beyond said flat surface except for the side portion thereof extending along one side of the said flat portion which is reduced in height, the lens carrying body portion of a camera, normally used with an interchangeable roll film back, having a rear face defining a window aligned with the camera lens, said camera body portion having a pair of spaced lugs protruding from its rear face adjacent its upper margin, said lugs having slots extending inwardly from one edge, and an interconnecting plate disposed between the holder and the said lens carrying body portion of a camera, said plate extending over said flat surface of the holder, means for attaching the plate to said flat surface, and means for attaching said plate to the rear face of said lens carrying body portion of a camera comprising latch means mounted for reciprocation on the rear surface of the plate and means biasing the latch means in a direction to enter the slots in said lugs, said camera body portion extending laterally beyond the plate and the peripheral rim of the holder through the space provided by the side portions of the holder rim which are reduced in height, the plate defining a window which in the assembled combination is aligned with the windows of the holder and the camera body portion.

2. The combination claimed in claim 1 in which the upper edge of the plate is notched with a pair of notches and the latch means is a bar mounted on the plate, the upper edges of the bar being notched, the spacing between the notches in the latch bar and in the plate being equal and also equal to the spacing between said lugs, said lugs being insertable in said notches, means for moving the latch bar to bring its notches into register with those in the plate, and means tending, when the plate and latch bar notches are in register, and the lugs are disposed within the superimposed notches, to move the latch bar relative to the plate to enter into the slots in said lugs.

3. The combination claimed in claim 1 in which the plate has a pair of slots adjacent its lower margin adapted to engage brackets projecting beyond the rear face of the camera body and thus coact with the said latch means in interconnecting the plate assembly and attached Polaroid type film pack holder to the camera body.

References Cited

UNITED STATES PATENTS

| | | | |
|---|---|---|---|
| 2,483,391 | 10/1949 | Gannon | 95—13 |
| 3,225,671 | 12/1965 | Friedman | 95—13 |
| 3,359,877 | 12/1967 | Kitrosser | 95—13 |

NORTON ANSHER, Primary Examiner

LEO H. McCORMICK, Jr., Assistant Examiner

U.S. Cl. X.R.

95—34